United States Patent
Corda

(10) Patent No.: US 9,607,192 B2
(45) Date of Patent: Mar. 28, 2017

(54) MIFARE PUSH

(71) Applicant: NXP B.V., Eindhoven (NL)

(72) Inventor: Alexandre Corda, Nice (FR)

(73) Assignee: NXP B.V., Eindhoven (NL)

( * ) Notice: Subject to any disclaimer, the term of this patent is extended or adjusted under 35 U.S.C. 154(b) by 234 days.

(21) Appl. No.: 14/512,783

(22) Filed: Oct. 13, 2014

(65) Prior Publication Data

US 2015/0029003 A1 Jan. 29, 2015

Related U.S. Application Data

(63) Continuation of application No. 12/993,516, filed as application No. PCT/IB2009/051982 on May 13, 2009, now Pat. No. 8,862,052.

(30) Foreign Application Priority Data

May 19, 2008 (EP) .................................... 08104008

(51) Int. Cl.
*H04B 5/00* (2006.01)
*G06K 7/10* (2006.01)
(Continued)

(52) U.S. Cl.
CPC ......... *G06K 7/10237* (2013.01); *G06F 21/35* (2013.01); *G06F 21/79* (2013.01);
(Continued)

(58) Field of Classification Search
None
See application file for complete search history.

(56) References Cited

U.S. PATENT DOCUMENTS

| 8,374,546 B2 * | 2/2013 | Maugars | ................... | H02J 7/34 |
| | | | | 455/41.1 |
| 2006/0071778 A1 * | 4/2006 | Vesikivi | ............ | G06F 17/30876 |
| | | | | 340/539.1 |

(Continued)

FOREIGN PATENT DOCUMENTS

| WO | 02069585 A2 | 9/2002 |
| WO | 2008/007260 | 1/2008 |

OTHER PUBLICATIONS

Anonymous: Mifare Standard Card IC MF1 IC S50 Functional Specification; Philips Semiconductors, Product Specifiction, Revision 4; 18 pages (Jul. 1, 1998).

(Continued)

*Primary Examiner* — Carlos E Garcia

(57) ABSTRACT

In an NFC mobile communication device (3) an operating system, such as a JAVA operating system (J2ME), is able to start software applications (6) identifiable by application identifications (AID). The mobile communication device (3) is equipped with a secure memory device (2), e.g. configured as a SmartMX card, which comprises a first memory portion (2a) configured as a MIFARE memory. The mobile communication device (3) comprises NFC means (5) adapted to trigger a hardware interruption (INT), when the first memory portion (2a) has been accessed by an external RFID reader (1). The hardware interruption (INT) is detected by the operating system (J2ME) and causes it to access a predefined sector (S) of the first memory portion (2a), to read information from said sector (S) which is representative for an application identification (AID) and to start the software applications (6) associated to it.

8 Claims, 3 Drawing Sheets

(51) Int. Cl.
*G06F 21/35* (2013.01)
*G06F 21/79* (2013.01)
*G06Q 20/32* (2012.01)
*H04L 29/06* (2006.01)
*H04W 12/06* (2009.01)

(52) U.S. Cl.
CPC ......... *G06K 7/10297* (2013.01); *G06Q 20/32* (2013.01); *G06Q 20/3227* (2013.01); *G06Q 20/3278* (2013.01); *H04L 63/0492* (2013.01); *H04L 63/0853* (2013.01); *H04W 12/06* (2013.01)

(56) References Cited

U.S. PATENT DOCUMENTS

| | | | | |
|---|---|---|---|---|
| 2007/0197261 A1* | 8/2007 | Humbel | ................ | G06Q 30/00 455/558 |
| 2008/0073426 A1* | 3/2008 | Koh | .................... | G06Q 20/06 235/380 |
| 2009/0085724 A1* | 4/2009 | Naressi | .................. | G06F 21/10 340/10.6 |
| 2009/0261172 A1* | 10/2009 | Kumar | ................ | H04W 12/02 235/492 |
| 2009/0315670 A1* | 12/2009 | Naressi | .................. | G06F 21/10 340/5.8 |
| 2011/0113473 A1* | 5/2011 | Corda | .................... | G06Q 20/32 726/3 |

OTHER PUBLICATIONS

International Search Report for Application PCT/IB2009/051982 dated Mar. 4, 2010.
Maugars, et al., Mar. 12, 2008.

* cited by examiner

| Sector | Block | Byte Number within a Block | | | | | | | | | | | | | | | | Description |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 | |
| 15 | 3 | Key A | | | | | | Access Bits | | | | Key B | | | | | | Sector Trailer 15 |
| | 2 | | | | | | | | | | | | | | | | | Data |
| | 1 | | | | | | | | | | | | | | | | | Data |
| | 0 | | | | | | | | | | | | | | | | | Data |
| 14 | 3 | Key A | | | | | | Access Bits | | | | Key B | | | | | | Sector Trailer 14 |
| | 2 | | | | | | | | | | | | | | | | | Data |
| | 1 | | | | | | | | | | | | | | | | | Data |
| | 0 | | | | | | | | | | | | | | | | | Data |
| ⋮ | ⋮ | | | | | | | | | | | | | | | | | |
| 1 | 3 | Key A | | | | | | Access Bits | | | | Key B | | | | | | Sector Trailer 1 |
| | 2 | | | | | | | | | | | | | | | | | Data |
| | 1 | | | | | | | | | | | | | | | | | Data |
| | 0 | | | | | | | | | | | | | | | | | Data |
| 0 | 3 | Key A | | | | | | Access Bits | | | | Key B | | | | | | Sector Trailer 0 |
| | 2 | | | | | | | | | | | | | | | | | Data |
| | 1 | | | | | | | | | | | | | | | | | Data |
| | 0 | | | | | | | | | | | | | | | | | Manufacturer Block |

Fig. 1

MSB  LSB
| x | x | x | x | x | x | x | 0 |

| Byte | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| | Serial Number | | | | Check Byte | Manufacturer Data | | | | | | | | | | |

Fig. 2

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Key A | | | | | | Access Bits | | | | Key B (optional) | | | | | |

Fig. 3

MIFARE PUSH

This is a continuation application of U.S. application Ser. No. 12/993,516 filed Nov. 19, 2010 (now allowed), which claims priority to International Application No. PCT/IB2009/051982 filed May 13, 2009, which also claims the benefit of priority to European Patent Application 08104008.1 filed May 19, 2008, each of which are hereby incorporated by reference for all purposes as if fully set forth herein.

The invention relates to a mobile communication device with Near Field Communication (NFC) capabilities, being operated by an operating system, such as a JAVA operating system, wherein the operating system is able to store and start software applications which are installed in the mobile communication device and are identifiable by application identifications.

The invention further relates to an RFID reader adapted to access a MIFARE portion of a secure memory device, which MIFARE portion comprises a plurality of memory sectors.

The MIFARE® classic family, developed by NXP Semiconductors is the pioneer and front runner in contactless smart card ICs operating in the 13.56 MHz frequency range with read/write capability. MIFARE® is a trademark of NXP Semiconductors. MIFARE complies with ISO14443 A, which is used in more than 80% of all contactless smart cards today. The technology is embodied in both cards and card reader devices. MIFARE cards are being used in an increasingly broad range of applications (including transport ticketing, access control, e-payment, road tolling, and loyalty applications). MIFARE Standard (or Classic) cards employ a proprietary high-level protocol with a proprietary security protocol for authentication and ciphering. MIFARE® technology has become a standard for memory devices with key-protected memory sectors. One example for a published product specification of MIFARE® technology is the data sheet "MIFARE® Standard Card IC MF1 IC S50—Functional Specification" (1998) which is herein incorporated by reference. MIFARE® technology is also discussed in: Klaus Finkenzeller, "RFID Handbuch", HANSER, 3$^{rd}$ edition (2002).

The MIFARE Classic cards are fundamentally just memory storage devices, where the memory is divided into sectors and blocks with simple security mechanisms for access control. Each device has a unique serial number. Anticollision is provided so that several cards in the field may be selected and operated in sequence.

The MIFARE Standard 1k offers about 768 bytes of data storage, split into 16 sectors with 4 blocks of 16 bytes each (one block consists of 16 bytes); each sector is protected by two different keys, called A and B. They can be programmed for operations like reading, writing, increasing value blocks, etc. The last block of each sector is called "trailer", which contains two secret keys (A and B) and programmable access conditions for each block in this sector. In order to support multi-application with key hierarchy an individual set of two keys (A and B) per sector (per application) is provided.

The memory organization of a MIFARE Standard 1k card is shown in FIG. 1. The 1024×8 bit EEPROM memory is organized in 16 sectors with 4 blocks of 16 bytes each. The first data block (block 0) of the first sector (sector 0) is the manufacturer block which is shown in detail in FIG. 2. It contains the serial number of the MIFARE card that has a length of four bytes (bytes 0 to 3), a check byte (byte 4) and eleven bytes of IC manufacturer data (bytes 5 to 15). The serial number is sometimes called MIFARE User IDentification (MUID) and is a unique number. Due to security and system requirements the manufacturer block is write protected after having been programmed by the IC manufacturer at production. However, the MIFARE specification allows to change the serial number during operation of the MIFARE card, which is particularly useful for MIFARE emulation cards like SmartMX cards.

SmartMX (Memory eXtension) is a family of smart cards that have been designed by NXP Semiconductors for high-security smart card applications requiring highly reliable solutions, with or without multiple interface options. Key applications are e-government, banking/finance, mobile communications and advanced public transportation.

The ability to run the MIFARE protocol concurrently with other contactless transmission protocols implemented by the User Operating System enables the combination of new services and existing applications based on MIFARE (e.g. ticketing) on a single Dual Interface controller based smart card. SmartMX cards are able to emulate MIFARE Classic devices and thereby makes this interface compatible with any installed MIFARE Classic infrastructure. The contactless interface can be used to communicate via any protocol, particularly the MIFARE protocol and self defined contactless transmission protocols. SmartMX enables the easy implementation of state-of-the-art operating systems and open platform solutions including JCOP (the Java Card Operating System) and offers an optimized feature set together with the highest levels of security. JCOP is an IBM® implementation of the Java Card 2.2.1 and Global Platform 2.1.1 basic specifications. JCOP handles different applications which are called applets, e.g. credit card applications. JCOP provides authentication and encryption mechanisms. SmartMX incorporates a range of security features to counter measure side channel attacks like DPA, SPA etc. A true anticollision method (acc. ISO/IEC 14443-3), enables multiple cards to be handled simultaneously.

It should be noted that the emulation of MIFARE Classic cards is not only restricted to SmartMX cards, but there may also exist other present or future smartcards being able to emulate MIFARE Classic cards.

Recently, mobile communication devices have been developed which contain smart cards like SmartMX cards. These mobile communication devices comprise e.g. mobile phones with Near Field Communication (NFC) capabilities, but are not limited to mobile phones.

FIG. 4 shows a schematic representation of a system comprising such a mobile communication device 3 with NFC capabilities configured as a mobile phone and being equipped with a secure memory device 2 configured as a SmartMX card. The secure memory device 2 comprises a first memory portion 2a configured as an emulated MIFARE memory, such as described with reference to FIGS. 1-3, and a second memory portion 2b configured as a high-secure memory portion operated under a Java Operating System such as JCOP. The second memory portion 2b offers security features like authentication and encryption, whereas the first memory portion 2a is protected by keys. Both memory portions 2a, 2b are accessible by a combined RFID/NFC reader 1. When the mobile communication device 3 enters (see arrows A1) or exits the RF field 4 of the reader 1, or when a transaction has been done between the mobile communication device 3 and the reader 1 (e.g. between the reader 1 and the second memory portion 2b of the secure memory device 2, see arrow A2) according to prior art the mobile communication device's 3 NFC chip 5 triggers a hardware interruption INT. This interruption INT is the only link existing between the operating system J2ME, e.g. a Java Virtual Machine, of the mobile communication device 3 and the NFC chip 5 to enable the operating system J2ME to detect that something has happened at NFC level. If during this connection an action (arrow A2) has been done between the reader 1 and the second memory portion 2a, i.e. the SmartMX JCOP part, the NFC stack (arrow A3) retrieves the last application accessed by its application identification AID and sends a push event (arrow A4) to the Java Virtual Machine J2ME. The Java Virtual Machine J2ME will then check (arrow A5) if there is a so called MIDlet 6 which is a Java Mobile Application registered to this kind of the push event for this specific application identification AID and if there is one, it will start it. This kind of connection between the JCOP part 2b of the secure memory device 2 and the reader 1 is mainly used for payment and high-level security applications.

The problem with this known handling of communication between the operating system J2ME of the mobile communication device 3 and the secure memory device 2 is that it only works for the second memory portion 2b which is operated under Java, particularly JCOP, but does not work for the first memory portion 2a which is configured as a MIFARE memory, since the MIFARE standard does not provide for this kind of software communication. Therefore, in case of ticketing, access control or other applications which are typically located in the MIFARE part 2a of the secure memory device 2 there is no way to retrieve specific information and trigger a push event to start the associated application 6, as shown in the diagram of FIG. 5. After the hardware interruption INT has occurred, there is no way for the software J2ME in the mobile communication device 3 to retrieve which sector of the MIFARE part 2a of the secure memory device 2 has been accessed by the reader 1. Therefore, the software J2ME cannot start an appropriate MIDlet application 6. Therefore, a user of the mobile communication device 3 will get the impression that nothing happens even if he definitely knows that his mobile communication device 3 is within the range of the RF field 4 of the reader 1, e.g. if he is at an entrance gate and swipes his mobile communication device 3 closely at the reader 1. Since there is no possibility for an application 6 to show any messages about the access of the reader 1 to the MIFARE part 2a of the secure memory device 2 the user will believe assume that there is a malfunction.

It is an object of the invention to provide a mobile communication device of the type defined in the opening paragraph and an RFID reader of the type defined in the second paragraph, in which the disadvantages defined above are avoided.

In order to achieve the object defined above, with a mobile communication device according to the invention characteristic features are provided so that a mobile communication device according to the invention can be characterized in the way defined below, that is:

A mobile communication device with Near Field Communication capabilities, being operated by an operating system, such as a JAVA operating system, wherein the operating system is able to start software applications which are installed in the mobile communication device and are identifiable by application identifications, wherein the mobile communication device is equipped with a secure memory device, e.g. configured as a SmartMX card, which comprises at least a first memory portion configured as a MIFARE memory with a plurality of memory sectors, which sectors are protected against unauthorized access by sector keys, wherein the mobile communication device comprises NFC means, particularly an NFC chip, being adapted to trigger a hardware interruption when the first memory portion has been accessed by an external RFID reader, which hardware interruption is detected by the operating system and causes the operating system to access a pre-defined sector of the first memory portion of the secure memory device and to read information from said sector which has been previously written by the external RFID reader, which information is representative for an application identification, to retrieve and to start a software application associated to the application identification.

In order to achieve the object defined above, with an RFID reader according to the invention characteristic features are provided so that an according to the invention can be characterized in the way defined below, that is:

An RFID reader being adapted to access a MIFARE portion of a secure memory device, which MIFARE portion comprises a plurality of memory sectors, wherein the RFID reader is configured to read data from sectors and to write data into sectors by transmitting the keys assigned to said sectors and the data, wherein the RFID reader is adapted to write information into a pre-defined sector of the MIFARE portion of the secure memory device, which information is representative for an application identification of a software application.

The present invention allows that a specific application within a mobile communication device is started when the MIFARE part of a secure memory device arranged in the mobile communication device is accessed from an external reader. This is an essential feature for all MIFARE mobile applications like ticketing, access control, transit and so on, since it allows to inform a user of any transactions occurred or the like.

The aspects defined above and further aspects of the invention are apparent from the exemplary embodiment to be described hereinafter and are explained with reference to this exemplary embodiment.

The invention will be described in more detail hereinafter with reference to an exemplary embodiment. However, the invention is not limited to this exemplary embodiment.

FIG. 1 shows the memory organization of a MIFARE Standard 1k EEPROM.

FIG. 2 shows the manufacturer block of a MIFARE memory.

FIG. 3 shows the sector trailer of a sector of MIFARE memory.

Figure 6:
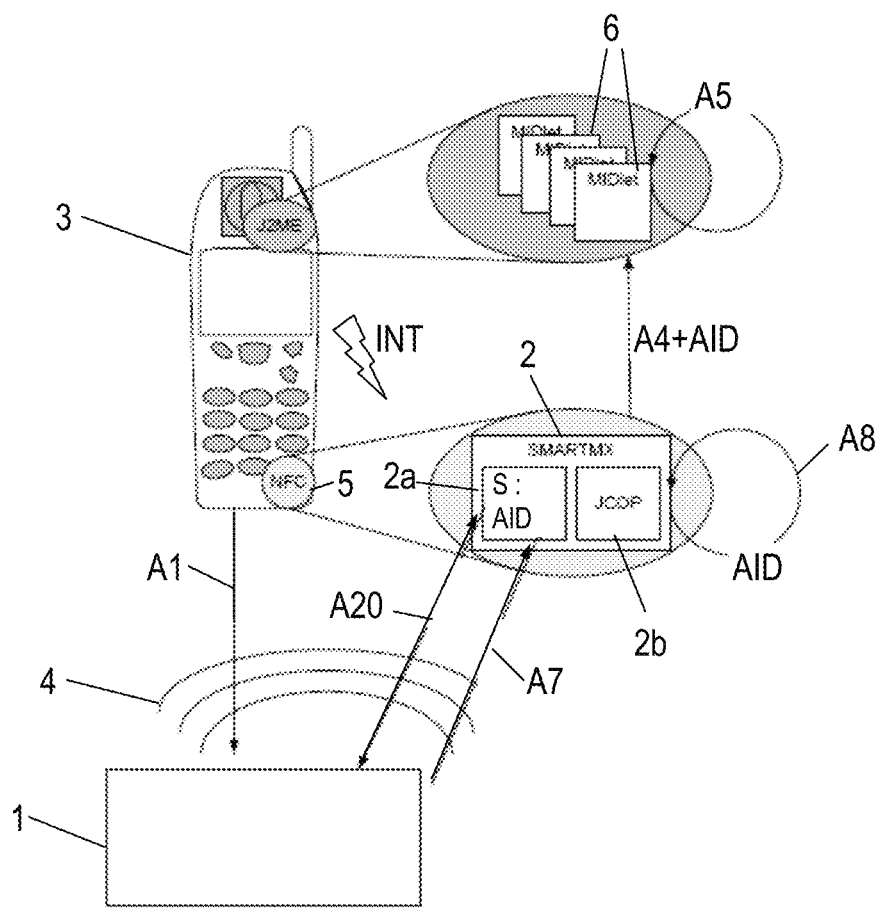
FIG. 6 shows a schematic representation of a mobile communication device with NFC capabilities and an RFID reader operated according to the present invention.

FIG. 6 shows a schematic representation of a system comprising a mobile communication device 3 with NFC capabilities configured as a mobile phone and an RFID reader 1. The mobile communication device 3 comprises a processor (not shown in the drawing) for executing software being internally stored in the mobile communication device. The software comprises an operating system for carrying out and managing all functions of the mobile communication device 3. The operating system is a Java system comprising a Java Virtual Machine J2ME. The mobile communication device 3 has its NFC capabilities due to a built-in NFC chip 5.

Further, the mobile communication device 3 is equipped with a secure memory device 2 configured as a SmartMX card which has its own computational power and multiple interface options. The secure memory device 2 comprises a first memory portion 2a which is configured as an emulated MIFARE memory. Access to its contents which are stored in sectors is granted by keys, as has been explained in the introduction of this document. Data are written into the first memory portion 2a and read out from it by the reader 1 according to the general MIFARE specifications. There is neither encryption nor authentication provided, but the advantage of this standard MIFARE configuration of the first portion 2a of the secure memory device 2 is that its access procedures can easily be handled. This MIFARE memory portion 2a is particularly useful for storing NFC applications that do not represent very high monetary values, such as tickets, transport passes, etc. The secure memory device 2 comprises a second memory portion 2b which is configured as a high-secure memory portion operated under a Java Operating System such as JCOP. The second memory portion 2b offers security features like authentication and encryption. The second memory portion 2b is also accessible by the reader 1.

Figure 4:
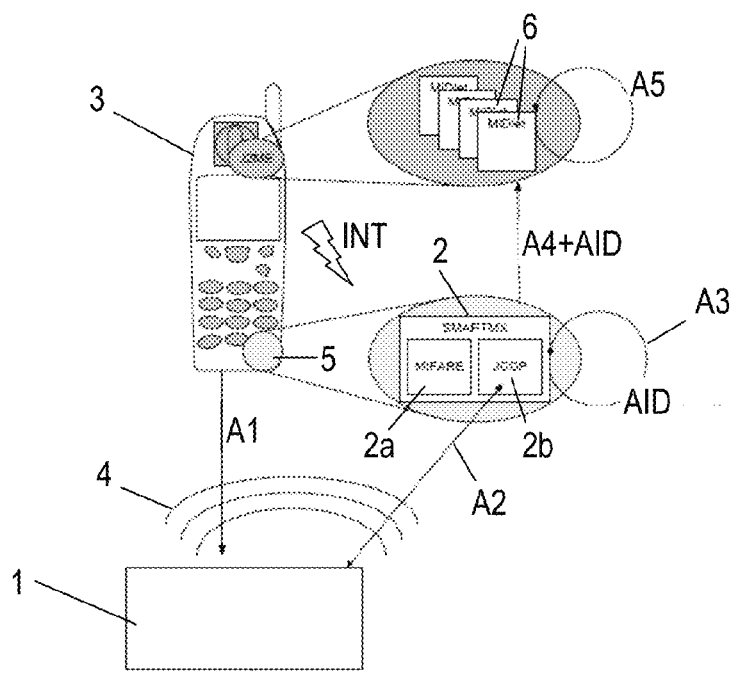
FIG. 4 and FIG. 5 show schematic representation of a mobile communication device with NFC capabilities and an RFID reader operated in a conventional manner.
Figure 5:
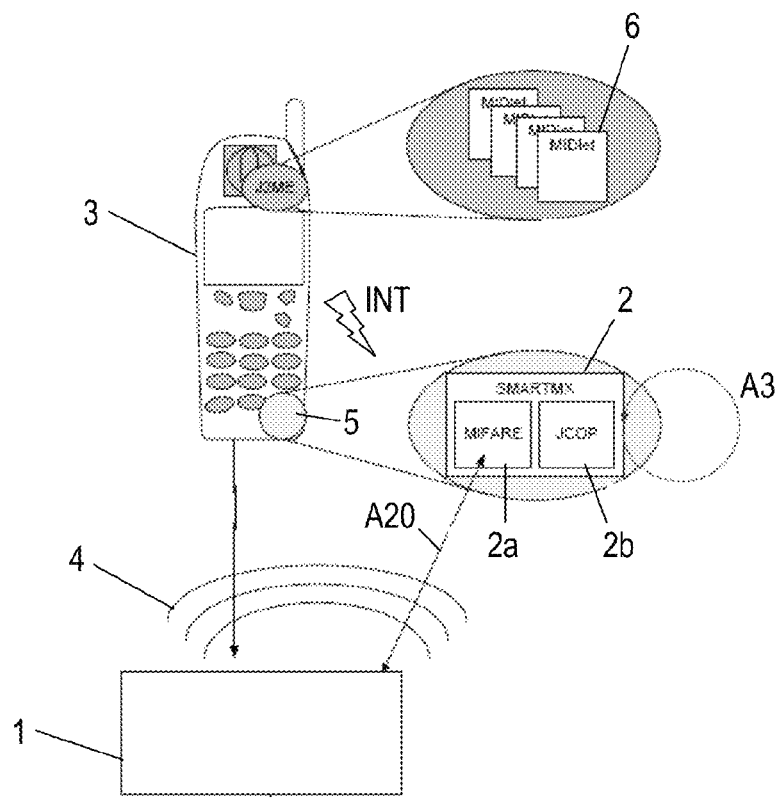

When the mobile communication device 3 enters (see arrows A1) the RF field 4 of the reader 1 a transaction A20 between the reader 1 and the MIFARE portion 2a can be carried out. However, in contrast to the conventional execution of the MIFARE transaction which has been described above with reference to FIG. 5, according to the present invention the reader 1 does not only carry out the transaction A20 (reading and/or writing) with the MIFARE portion 2a of the secure memory device 2, but additionally writes specific information in a pre-defined sector S of the MIFARE portion 2a, which specific information is representative for an application identification AID of one of the MIDlets 6 stored in the mobile communication device 3. When the NFC chip 5 realizes that the reader 1 has accessed the MIFARE portion 2a of the secure memory device 2, it generates the hardware interruption INT which causes the NFC stack of the operating system to wake up. According to the invention the NFC stack accesses the pre-defined sector S of the MIFARE portion 2a of the secure memory device 2 and reads (arrow A8) the information representative for an application identification AID, which has previously been written in by the reader 1.

Then, the NFC stack triggers a NFC push event with this retrieved application identification AID (arrow A4). The Java Virtual Machine J2ME is able to check if a MIDlet 6 which is associated to this retrieved application identification AID has been installed in the mobile communication device 3, and if so, starts this MIDlet 6 (arrow A5). Please note that the last step is a standard PUSH feature of said Java Virtual Machine J2ME. This MIDlet 6 will inform the user of the mobile communication device that an access to the MIFARE portion 2a of the secure memory device 2 has occurred, e.g. by showing a message in a display of the mobile communication device 3, or the like.

Examples of how to write specific data into a pre-defined sector of the MIFARE portion 2a are the following:

Using non NDEF MIFARE compliant data

The MIFARE portion 2a of the secure memory device 2 SMARTMX is divided in x sectors containing 4 blocks of 16 Bytes each. To use this feature, the reader 1 writes the specific information which is representative for an application identification AID in sector 0 block 1 to store a 16 bytes identification number.

Using MIFARE NDEF compliant data

The following record can be used:
TYPE=ext:nxp.com
KEY=MIFAREPUSHAID
PAYLOAD=Application ID The main focus of the present invention the OTA (Over the Air) provisioning of new services like ticketing, transit, access control and so on for mobile communication device 3 with NFC capabilities. It overcomes the severe disadvantage that hitherto there was no way to warn users of said mobile communication devices 3 when accesses to the MIFARE portion 2a of the secure memory devices had occurred.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The indefinite article "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method performed by an RFID reader, comprising:
   accessing, with a RFID reader, a MIFARE portion of a secure memory device, wherein the MIFARE portion comprises a plurality of memory sectors;
   reading data, with the RFID reader, from the plurality of memory sectors;
   writing data, with the RFID reader, into the plurality of memory sectors by transmitting the keys assigned to said plurality of memory sectors and the data; and
   writing information, with the RFID reader, into a pre-defined sector of the MIFARE portion of the secure memory device, wherein the written information is representative for an application identification of a specific software application and the specific software application starts when the pre-defined sector is accessed.

2. The method of claim 1, further comprising:
   generating a push event with the application identification, wherein the push event causes starting of an associated software application.

3. The method of claim 1, wherein the software application comprises JAVA MIDlets.

4. The method of claim 1, wherein the RFID reader is configured as an NFC mobile phone.

5. The method of claim 1, wherein the secure memory device is configured as a SmartMX card.

6. The method of claim 1, wherein a first memory portion has neither encryption nor authentication.

7. The method of claim 6, wherein the secure memory device further comprises:
   a second memory portion.

8. The method of claim 7, wherein the second memory portion has both encryption and authentication.

* * * * *